(12) United States Patent
Morita et al.

(10) Patent No.: US 8,894,778 B2
(45) Date of Patent: Nov. 25, 2014

(54) CARBURIZED AND HIGH-FREQUENCY HARDENED PART HAVING HIGH STRENGTH

(75) Inventors: Toshiyuki Morita, Nagoya (JP); Kouji Ohbayashi, Anjo (JP); Masaki Kuwabara, Anjo (JP); Taro Matsukawa, Anjo (JP); Yutaka Eto, Anjo (JP); Kohki Mizuno, Anjo (JP)

(73) Assignees: Daido Tokushuko Kabushiki Kaisha, Nagoya, Aichi (JP); Aisin Aw Co., Ltd., Anjo-Shi, Aichi (JP)

( * ) Notice: Subject to any disclaimer, the term of this patent is extended or adjusted under 35 U.S.C. 154(b) by 726 days.

(21) Appl. No.: 12/078,898

(22) Filed: Apr. 8, 2008

(65) Prior Publication Data

US 2008/0247901 A1 Oct. 9, 2008

(30) Foreign Application Priority Data

Apr. 9, 2007 (JP) ................. 2007-102249

(51) Int. Cl.
| | | |
|---|---|---|
| *C23C 8/22* | (2006.01) | |
| *C21D 1/06* | (2006.01) | |
| *C21D 9/32* | (2006.01) | |
| *C21D 6/02* | (2006.01) | |
| *C22C 38/42* | (2006.01) | |
| *C22C 38/02* | (2006.01) | |
| *C21D 1/74* | (2006.01) | |
| *C22C 38/04* | (2006.01) | |
| *C22C 38/08* | (2006.01) | |

(52) U.S. Cl.
CPC . *C22C 38/02* (2013.01); *C21D 1/06* (2013.01); *C21D 1/74* (2013.01); *C21D 9/32* (2013.01); *C22C 38/04* (2013.01); *C22C 38/08* (2013.01)
USPC ........... 148/319; 148/328; 148/335; 148/210; 148/223; 148/586; 148/622

(58) Field of Classification Search
USPC ........... 148/400, 320, 330, 332–337, 95, 206, 148/210, 223, 225, 559, 566–576, 579, 625, 148/628, 633, 708, 712, 714, 233, 586, 627, 148/639, 644, 660–664; 420/8, 83, 89–93, 420/103–106, 108–110, 112, 119–121, 123, 420/124, 126, 127
See application file for complete search history.

(56) References Cited

U.S. PATENT DOCUMENTS

| | | | |
|---|---|---|---|
| 6,019,857 A | * | 2/2000 | Mutagami ...................... 148/233 |
| 2005/0205164 A1 | * | 9/2005 | Tachisato ...................... 148/225 |
| 2007/0044866 A1 | | 3/2007 | Morita et al. .................. 148/319 |
| 2007/0102068 A1 | | 5/2007 | Taniguchi et al. ............. 148/222 |

FOREIGN PATENT DOCUMENTS

| | | | |
|---|---|---|---|
| CN | 1920080 | 2/2007 | |
| JP | 64-036779 | 2/1989 | |
| JP | 05-255733 | 10/1993 | |
| JP | 8-060236 | 3/1996 | |
| JP | 08-311607 | * 11/1996 | ............. C22C 38/00 |
| JP | 9-053149 | 2/1997 | |
| JP | 10-018020 | 1/1998 | |
| JP | 10-147814 | 6/1998 | |
| WO | WO2006/118242 | 11/2006 | |
| WO | WO2006/118243 | 11/2006 | |

OTHER PUBLICATIONS

Hassell, Peter A.; Ross, Nicholas V.; "Induction Heat Treating of Steel," vol. 4: Heat Treating, ASM Handbooks Online, ASM International, 2002.*

Bates, Charles E.; Totten, George E.; Brennan, Robert L.; "Quenching of Steel," vol. 4: Heat Treating, ASM Handbooks Online, ASM International, 2002.*

* cited by examiner

*Primary Examiner* — Scott Kastler
*Assistant Examiner* — Vanessa Luk
(74) *Attorney, Agent, or Firm* — Bacon & Thomas, PLLC

(57) ABSTRACT

The present invention relates to a mechanical part, which is obtained by: processing a steel into a shape of a part, the steel having an alloy composition containing, by weight percent, C: 0.10 to 0.30%, Si: 0.50 to 3.00%, Mn: 0.30 to 3.00%, P: 0.030% or less, S: 0.030% or less, Cu: 0.01 to 1.00%, Ni: 0.01 to 3.00%, Cr: 0.20 to 1.00%, Al: 0.20% or less, N: 0.05% or less, and the remainder of Fe and inevitable impurities, and the alloy composition satisfying the following condition:

$$[Si\%]+[Ni\%]+[Cu\%]-[Cr\%]>0.50,$$

in which [Si %], [Ni %], [Cu %] and [Cr %] represent the concentration of Si, the concentration of Ni, the concentration of Cu and the concentration of Cr in the alloy composition, respectively; subjecting the steel to a carburizing treatment in a vacuum, followed by gradually cooling the steel; and subsequently subjecting the steel to a high-frequency hardening to thereby harden a surface of the steel.

21 Claims, No Drawings

CARBURIZED AND HIGH-FREQUENCY HARDENED PART HAVING HIGH STRENGTH

FIELD OF THE INVENTION

The invention relates to a mechanical part which is subjected, as surface hardening means of a steel, to a carburization and a high-frequency hardening employed in combination.

BACKGROUND OF THE INVENTION

When a mechanical part required to have a high surface hardness, such as a gear, is produced using a steel as a material thereof, carburization and high-frequency hardening are typical as means for surface hardening. Carburization is an operation for increasing a carbon concentration of a part surface. As the result of the carburization, high mechanical strength may be obtained. However, owing to the hardening following the carburization, the part is rendered a martensite phase to the inside of the part; accordingly, there is a problem that the residual strain is large. On the other hand, high-frequency hardening is an operation that hardens only a surface a part without changing the internal structure of the part; accordingly, there is an advantage that the strain is small. However, from the viewpoint of productivity, since there is a limit on an attainable surface carbon concentration, high mechanical strength may not be expected.

A surface treatment where the carburization and the high-frequency hardening are combined to realize features of the both has been attempted. As one of these, a technology where the carburizing and hardening are applied under a specific carbon potential to obtain a carburized product in which a difference of a surface carbon concentration and a core carbon concentration is rendered a definite value or more, and the carburized product is then subjected to a high-frequency hardening to austenitize 0.3 to 1.5 times a total hardened layer depth at the time of carburization has been disclosed in JP-A-64-36779. According to this document, it is described that an old austenite grain size that affects on the fatigue strength of the carburized product may be miniaturized to No. 10 or more in accordance with the JIS grain size number.

There is another proposal where a case-hardened steel having a specific alloy composition is, after carburizing and hardening, tempered at a temperature in the range of 400 to 600° C., followed by applying high-frequency hardening to recover the hardness of a carburized layer softened by the tempering (see, JP-A-5-255733). According to this document, it is described that a product obtained by this method sufficiently secures various characteristics usually required for the carburized product such as the tensile strength, impact strength, carburized layer hardness and like, as well as excellent delayed fracture resistance.

In order to improve the fatigue strength and the impact strength of a part, it is necessary to miniaturize the grain size. In this regard, there has been proposed a heat treatment process where, after the carbonitriding and hardening, a second hardening step where steel is heated to an austenite region and then hardened is carried out, in order to realize miniaturization of grain size in surface hardened parts (see, JP-A-10-18020). According to this method, owing to the carbonitriding and hardening, a steel containing carbon and nitrogen is transformed from an austenite phase to a martensite phase and the grain size is subsequently miniaturized according to the second hardening.

The inventors intended gradually cooling from a carburization step without applying the hardening and hardening at s subsequent high-frequency hardening, to thereby heighten the surface hardness while averting generation of strain caused by the carburizing and hardening. When JIS steel species such as SCR420 and SCM420, that have been used in producing a carburized product, are used as a material, desired mechanical strength may not be obtained. As a result of investigating the reason for this, it was found that carbide generated at the carburization remains without dissolving in a matrix in the step of high-frequency hardening and the carbide in the carburized product becomes a starting point to forward the fracture. In the high-frequency hardening, since a heating time is short, the carbide does not have enough time to dissolve in to the matrix. In order to avert this, it is necessary to lower a carbon concentration. However, since there is a proportional relationship between the surface carbon concentration and the mechanical strength, when the carbon concentration is lowered, the mechanical strength becomes deteriorated.

As a means for carburizing, in addition to a conventional gas carburization, recently, a vacuum carburization has been frequently employed. The vacuum carburization has, for example, the following advantages in comparison with the gas carburization.

1) Since a grain boundary oxidation at the carburization may be averted, high mechanical strength tends to be readily obtained.
2) The carburization can be rapidly conducted due to the easiness of a high temperature operation.
3) The running cost is inexpensive.

In view of these advantages, the vacuum carburization is used to produce various kinds of gears and shafts. However, there is a problem that the difference of the carbon concentrations depending on positions of a part is large. In particular, a portion having an edge shape tends to be high in the carbon concentration, and therefore, an amount of residual carbon as well is abundant there, whereby it is more difficult to combine the vacuum carburization with the high-frequency hardening. In this connection, the inventors considered a mechanism where an alloy composition in which carbide is difficult to generate is selected, whereby the carbide is not necessarily expected to dissolve during high-frequency hardening and established an alloy composition of carburized steel that realizes the mechanism.

SUMMARY OF THE INVENTION

The invention intends to provide a technology that makes use of the above-mentioned findings of the inventors and combines the carburization and the high-frequency hardening at the production of a mechanical part to obtain a product.

Specifically, it intends to provide a mechanical part that is less as a whole in the strain and high in the surface hardness by gradually cooling after the carburization to avert a martensitic transformation of a composition, followed by high-frequency hardening.

Namely, the present invention relates to the followings.
(1) A mechanical part, which is obtained by:
processing a steel into a shape of a part,
said steel having an alloy composition comprising,
by weight percent,
C: 0.10 to 0.30%,
Si: 0.50 to 3.00%,
Mn: 0.30 to 3.00%,
P: 0.030% or less,
S: 0.030% or less, Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

$$[Si\,\%]+[Ni\,\%]+[Cu\,\%]-[Cr\,\%]>0.50,$$

wherein [Si %], [Ni %], [Cu %] and [Cr %] represent the concentration of Si, the concentration of Ni, the concentration of Cu and the concentration of Cr in the alloy composition, respectively;
subjecting the steel to a carburizing treatment in a vacuum, followed by gradually cooling the steel; and
subsequently subjecting the steel to a high-frequency hardening to thereby harden a surface of the steel.

(2) The mechanical part according to (1), wherein the alloy composition of the steel further comprises, by weight percent,
Mo: 2.00% or less.

(3) The mechanical part according to (1) or (2), wherein the alloy composition of the steel further comprises, by weight percent,
at least one kind selected from the group consisting of
Nb: 0.20% or less,
Ti: 0.20% or less, and
B: 0.01% or less.

(4) The mechanical part according to any one of (1) to (3), wherein said gradual cooling after the carburizing treatment is carried out at a cooling rate of 1° C./sec or less.

(5) The mechanical part according to any one of (1) to (4), which has a surface carbon concentration in the range of 0.85 to 1.50 weight %.

(6) A process for producing a mechanical part, which comprises:
processing a steel into a shape of a part,
said steel having an alloy composition comprising, by weight percent,
C: 0.10 to 0.30%,
Si: 0.50 to 3.00%,
Mn: 0.30 to 3.00%,
P: 0.030% or less,
S: 0.030% or less,
Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

$$[Si\,\%]+[Ni\,\%]+[Cu\,\%]-[Cr\,\%]>0.50,$$

wherein [Si %], [Ni %], [Cu %] and [Cr %] represent the concentration of Si, the concentration of Ni, the concentration of Cu and the concentration of Cr in the alloy composition, respectively;
subjecting the steel to a carburizing treatment in a vacuum, followed by gradually cooling the steel; and
subsequently subjecting the steel to a high-frequency hardening to thereby harden a surface of the steel.

(7) The process for producing a mechanical part according to (6), wherein the alloy composition of the steel further comprises, by weight percent,
Mo: 2.00% or less.

(8) The process for producing a mechanical part according to (6) or (7), wherein the alloy composition of the steel further comprises, by weight percent,
at least one kind selected from the group consisting of
Nb: 0.20% or less,
Ti: 0.20% or less, and
B: 0.01% or less.

(9) The process for producing a mechanical part according to any one of (6) to (8), wherein said gradual cooling after the carburizing treatment is carried out at a cooling rate of 1° C./sec or less.

(10) The process for producing a mechanical part according to any one of (6) to (9), wherein the mechanical part has a surface carbon concentration in the range of 0.85 to 1.50 weight %.

In the above alloy composition, the amount of the carbide generated during the carburization is small and the carbide generated during the gradual cooling may be readily dissolved due to the reheating during the high-frequency hardening.

A mechanical part of the invention, which comprises a material having the above alloy composition, is less in carbide formed during the carburization. Accordingly, even when, without conducting the carburization and hardening, the gradual cooling is applied and the hardening is conducted by the high-frequency hardening, a problem caused by the residual carbide may be avoided. This is because, although the high-frequency hardening cannot dissolve a large amount of carbide, there is no need thereof. Since the carburization is not followed by the hardening, only a small strain generates accompanied with the generation of martensite. Additionally, the high-frequency hardening is as well a hardening method which causes only a small strain. Consequently, owing to the combined effect thereof, a mechanical part thus obtained becomes a product almost free from the strain.

When the high-frequency hardening is conducted, so far, in order to reduce the residual carbide, the carburization has to be carried out with a surface carbon concentration set low. However, in the case of the invention where the carbide is less generated during the carburization and the carbide generated during the gradual cooling as well may be readily dissolved by the reheating during the high-frequency hardening, a sufficient carbon concentration may be imparted to a surface of a product. Accordingly, the surface hardness of the product can be heightened to thereby obtain the product having high mechanical strength. Thus, a mechanical part of the invention is a product which is almost free from the strain and has high mechanical strength.

DETAILED DESCRIPTION OF THE INVENTION

In the followings, the invention will be described in detail.
Herein, in the present specification, all the percentages are those defined by weight, unless otherwise indicated. Additionally, all the percentages defined by weight are the same as those defined by mass.

Of the composition of a steel for use in carburization in the invention, indispensable components and arbitrary components will be sequentially described.

C: 0.10 to 0.30%

An amount of C mentioned above is an appropriate range for obtaining the mechanical strength necessary as the mechanical part.

Mn: 0.30 to 3.00%

An element, Mn, is added to a steel during melting a steel as a deoxidizer.

However, since Mn does not so much affect on the generation of carbide, an amount thereof may be selected from the above-mentioned broad range. Further, the amount of Mn is preferably in the range of 0.60 to 1.50%.

P: 0.030% or less, S: 0.030% or less

These elements are impurities and unfavorable components for the mechanical property of a product. Accordingly, the amounts thereof is preferably as small as possible. The above values are both allowable maxima.

Si: 0.50 to 3.00%, Ni: 0.01 to 3.00% and Cu: 0.01 to 1.00%

Elements Si, Ni and Cu are, as mentioned above, components that inhibit the generation of carbide. These elements have to be added more than the respective lower limit values thereof and a value obtained by subtracting an amount of Cr from a sum total thereof has to exceed 0.50. However, when these elements are added excessively, the hot workability may be deteriorated. Accordingly, the upper limits of the amounts thereof are set respectively. In this regard, the amount of Si is preferably in the range of 0.80 to 1.50%.

Cr: 0.20 to 1.00%

An element Cr is a component that promotes generation of carbide. Therefore, in the steel for use in carburization of the invention, Cr may not be added in a large amount. An amount of 1.00% is an upper limit of a Cr amount allowable when the components that inhibit the generation of carbide are present in large amounts. An amount of Cr more than 1.00% may not be added, from the viewpoint of the workability, in particular, the machinability. However, when an amount of Cr is too small, the hardenability is lowered and the mechanical characteristics of a product become insufficient. Accordingly, the lower limit value thereof is set at 0.20%.

Al: 0.20% or less

An element Al is added as a deoxidizer. However, when it is added too much, alumina is generated in the steel to reduce the mechanical strength. Accordingly, Al should not be added too much. The formation of alumina is unfavorable also from the viewpoint of deteriorating the workability. From these reasons, an addition amount of Al up to 0.20% may well be selected. On the other hand, Al has a role of inhibiting crystal grains from becoming coarser. Accordingly, when such a effect is demanded, 0.005% or more thereof may well be added.

N: 0.05% or less

Since an element N has an action of inhibiting crystal grains from becoming coarser, at least 0.001% thereof is preferably present. Since the effect saturates at substantially 0.05%, an addition exceeding the amount is useless.

$$[Si\%]+[Ni\%]+[Cu\%]-[Cr\%]>0.50$$

In this formula, [Si %], [Ni %], [Cu %] and [Cr %] represent the concentration of Si, the concentration of Ni, the concentration of Cu and the concentration of Cr in the alloy composition, respectively.

As mentioned above, Si, Ni and Cu inhibit the generation of the carbide, while Cr increases the generation of the carbide. Accordingly, when an influence of former three and an influence of the latter one are balanced so as to make the suppression effect higher, the generation of the carbide in a carburized surface layer can be inhibited, whereby, even when the high-frequency hardening in which the carbide is not expected to dissolve is adopted, the deterioration of the mechanical strength may be inhibited owing to the residual carbide.

A steel for use in carburization, which is rendered a material of a mechanical part of the invention, may contain, in addition to the above-mentioned indispensable alloy components, one or two of arbitrary additional components below.

(a) Mo: 2.00% or less and
(b) at least one kind selected from the group consisting of Nb: 0.20% or less, Ti: 0.20% or less and B: 0.01% or less Mo: 2.00% or less An element Mo may be added to improve the hardenability and heighten the temper softening resistance. When an excessive amount of Mo is added, the workability of the steel becomes poor. Accordingly, an appropriate amount of 2.00% or less has to be selected. Further, the amount of Mo is preferably in the range of 0 to 0.50%.

Nb: 0.20% or less, Ti: 0.20% or less

These elements are effective for inhibiting the grow of crystal grains generated during the carburization and retaining a granulated structure. When these elements are added excessively, they adversely affect on the workability. Accordingly, these elements are added within the respective allowable limits.

B: 0.01% or less

Since an element B is effective for improving the hardenability, it is added according to the necessity. When a large amount of B is present, the workability is deteriorated. Accordingly, an addition amount of 0.01% or less is selected.

In this regard, with regard to each element contained in the steel of the invention, according to an embodiment, the minimal amount thereof present in the steel is the smallest non-zero amount used in the Examples of the developed steels as summarized in Table 1. According to a further embodiment, the maximum amount thereof present in the steel is the maximum amount used in the Examples of the developed steels as summarized in Table 1.

As to a process for producing a mechanical part according to the invention, the processing of a steel into a shape of a part include forging and machine work of the steel. The term "forging" used herein includes hot forging and cold forging. Further, a carburization is conducted in accordance with a vacuum carburization. At the gradual cooling after the carburization, a cooling rate of 1° C./sec or less is preferably adopted.

According to a mechanical part of the invention, a surface carbon concentration thereof may be preferably set at a concentration such high as 0.85% or more. In a mechanical part to which ordinary carburization and hardening are applied, it is known that, with an increase in the surface carbon concentration, the surface hardness increases and shows the maximum value at substantially 0.8%; however, when the surface carbon concentration increases more than that, contrary to the above, the surface hardness tends to decrease. Accordingly, the carburization is usually conducted so that the surface carbon concentration may be around 0.8%. This is because the residual austenite generated by the carburization and hardening is soft. However, in the invention, since the high-frequency hardening is applied, the residual austenite is not generated, whereby the softening is not caused. Consequently, even when the surface carbon concentration increases to exceed 0.8%, the surface hardness does not begin lowering. As a result, by setting the surface carbon concentration at 0.85% or more, or even at 0.90% or more, higher surface hardness may be realized. However, since an increase in the surface hardness tends to saturate with an increase in the surface carbon concentration, excessively high carbon concentration cannot be advantageously imparted.

EXAMPLES

Steels for use in carburization, which have alloy compositions shown in Table 1, were melted. The respective materials were mechanically processed into a shape of a sample gear shown below.

module: 2.5,
number of gears: 30,
diameter of pitch circle: 82.753 mm,
tooth width: 20 mm
angle of twist: 25°

Subsequently, vacuum carburization in which a temperature was maintained in the range of 900 to 1050° C. and the degree of depressurization was in the range of 0.001 to 0.1 bar was conducted using acetylene gas or propane gas. After the carburization, the respective works were gradually cooled to 500° C. by gas cooling at a cooling rate of 0.1° C./sec, using nitrogen or air as a refrigerant. With respect to the carburized gears, absence or presence of carbide and the surface carbon concentration were measured.

The gears after the gradual cooling were subjected to the high-frequency hardening under the conditions below to harden a tooth surface.

Heating: within 10 sec at a temperature in the range of 760 to 900° C.
Holding: within 1 min at a temperature in the range of 760 to 900° C.
Hardening: water cooling at a cooling rate of 200 to 2,000° C./sec or more The gear was rotated under the load and the tooth base stress where the tooth base was broken at the $10^7$ rotations was evaluated. The tooth base stress was taken as a measure of the tooth base fatigue strength. A tooth base of another sample gear was subjected to a shot-peening treatment to strengthen the tooth base. The gear was similarly rotated under the load and the tooth surface stress where the tooth base was broken at the $10^7$ rotations was evaluated. The tooth surface stress was taken as a measure of the tooth surface fatigue strength. Results thereof are shown in Table 2, together with the presence or absence of the carbide and the surface carbon concentration after the carburization.

TABLE 1

Alloy Composition

Component (by weight percent, the remainder is Fe)

| | C | Si | Mn | P | S | Cu | Ni | Cr | Mo | Al | N | Others | Si + Ni + Cu − Cr |
|---|---|---|---|---|---|---|---|---|---|---|---|---|---|
| Example 1 | 0.29 | 1.45 | 1.30 | 0.020 | 0.015 | 0.46 | 2.25 | 0.21 | 0.11 | 0.166 | 0.0153 | — | 3.95 |
| Example 2 | 0.19 | 0.82 | 1.07 | 0.013 | 0.008 | 0.17 | 0.04 | 0.35 | 0.34 | 0.142 | 0.0161 | — | 0.68 |
| Example 3 | 0.25 | 0.99 | 0.86 | 0.013 | 0.013 | 0.16 | 1.50 | 0.90 | 0.36 | 0.021 | 0.0144 | — | 1.75 |
| Example 4 | 0.19 | 1.04 | 1.21 | 0.029 | 0.025 | 0.97 | 0.24 | 0.71 | 0.46 | 0.081 | 0.0155 | — | 1.54 |
| Example 5 | 0.27 | 1.30 | 1.40 | 0.027 | 0.008 | 0.58 | 0.74 | 0.88 | 0.15 | 0.127 | 0.0153 | — | 1.74 |
| Example 6 | 0.28 | 0.79 | 1.22 | 0.021 | 0.012 | 0.60 | 2.19 | 0.87 | 0.17 | 0.046 | 0.0155 | — | 2.71 |
| Example 7 | 0.15 | 1.36 | 0.69 | 0.005 | 0.017 | 0.67 | 1.41 | 0.65 | 0.14 | 0.071 | 0.0149 | — | 2.79 |
| Example 8 | 0.12 | 1.19 | 1.43 | 0.029 | 0.021 | 0.50 | 2.55 | 0.95 | 0.16 | 0.028 | 0.0149 | Nb: 0.10 | 3.29 |
| Example 9 | 0.16 | 1.41 | 1.03 | 0.024 | 0.001 | 0.42 | 2.78 | 0.67 | 0.13 | 0.067 | 0.0147 | Nb: 0.05 | 3.94 |
| Example 10 | 0.12 | 0.53 | 0.80 | 0.010 | 0.003 | 0.18 | 2.80 | 0.23 | 0.48 | 0.032 | 0.0151 | Ti: 0.15 | 3.28 |
| Example 11 | 0.11 | 0.93 | 0.80 | 0.006 | 0.021 | 0.95 | 1.50 | 0.68 | 0.27 | 0.097 | 0.0153 | Ti: 0.05 | 2.70 |
| Example 12 | 0.20 | 0.95 | 1.40 | 0.008 | 0.017 | 0.02 | 0.24 | 0.33 | 0.21 | 0.176 | 0.0152 | Ti: 0.05, B: 0.005 | 0.88 |
| Example 13 | 0.30 | 1.21 | 0.64 | 0.002 | 0.004 | 0.64 | 2.23 | 0.32 | 0.26 | 0.150 | 0.0151 | Ti: 0.05, B: 0.0008 | 3.76 |
| Example 14 | 0.21 | 1.05 | 1.41 | 0.008 | 0.018 | 0.27 | 0.29 | 0.57 | 0.16 | 0.113 | 0.0153 | — | 1.04 |
| Example 15 | 0.14 | 0.85 | 1.34 | 0.023 | 0.009 | 0.15 | 1.42 | 0.33 | 0.00 | 0.143 | 0.0155 | — | 2.09 |
| Example 16 | 0.24 | 0.98 | 0.90 | 0.002 | 0.009 | 0.64 | 0.69 | 0.83 | 0.48 | 0.063 | 0.0149 | — | 1.48 |
| Example 17 | 0.20 | 0.64 | 0.56 | 0.029 | 0.022 | 0.46 | 1.17 | 0.28 | 0.29 | 0.115 | 0.0151 | — | 1.99 |
| Example 18 | 0.12 | 0.73 | 0.95 | 0.015 | 0.020 | 0.32 | 0.17 | 0.70 | 0.39 | 0.130 | 0.0149 | — | 0.52 |
| Example 19 | 0.24 | 0.59 | 0.83 | 0.012 | 0.024 | 1.00 | 0.74 | 0.46 | 0.12 | 0.041 | 0.0148 | — | 1.87 |
| Comparative Example 1 | 0.19 | 0.54 | 0.92 | 0.003 | 0.006 | 0.16 | 0.12 | 0.99 | 0.26 | 0.040 | 0.0151 | — | −0.17 |
| Comparative Example 2 | 0.19 | 0.70 | 0.76 | 0.022 | 0.003 | 0.03 | 0.07 | 0.86 | 0.33 | 0.020 | 0.0155 | — | −0.06 |
| Comparative Example 3 | 0.24 | 0.53 | 1.38 | 0.015 | 0.007 | 0.19 | 0.31 | 0.83 | 0.11 | 0.050 | 0.0154 | — | 0.20 |
| Comparative Example 4 | 0.22 | 0.54 | 1.15 | 0.004 | 0.002 | 0.09 | 0.13 | 0.96 | 0.18 | 0.010 | 0.0153 | — | −0.20 |
| Comparative Example 5 | 0.17 | 0.40 | 0.53 | 0.008 | 0.004 | 0.19 | 0.20 | 0.38 | 0.25 | 0.020 | 0.0149 | — | 0.41 |
| Comparative Example 6 | 0.15 | 0.17 | 0.72 | 0.016 | 0.005 | 0.21 | 0.17 | 0.85 | 0.17 | 0.022 | 0.0151 | — | −0.30 |

TABLE 2

| No. | Carburizing gas | Surface carbon concentration (weight percent) | Presence or absence of carbide | Tooth base fatigue strength (GPa) | Tooth surface fatigue strength (GPa) |
|---|---|---|---|---|---|
| Example 1 | acetylene | 0.88 | absent | 1218 | 3.41 |
| Example 2 | acetylene | 0.86 | absent | 1208 | 3.16 |
| Example 3 | acetylene | 0.82 | absent | 1111 | 3.02 |
| Example 4 | acetylene | 0.87 | absent | 1157 | 3.36 |
| Example 5 | acetylene | 0.87 | absent | 1163 | 3.16 |
| Example 6 | acetylene | 0.88 | absent | 1133 | 3.26 |
| Example 7 | acetylene | 0.76 | absent | 1060 | 2.80 |
| Example 8 | acetylene | 0.84 | absent | 1192 | 3.09 |
| Example 9 | acetylene | 0.77 | absent | 1148 | 2.83 |
| Example 10 | acetylene | 0.82 | absent | 1159 | 3.15 |
| Example 11 | acetylene | 0.85 | absent | 1197 | 3.24 |
| Example 12 | acetylene | 0.79 | absent | 1142 | 2.94 |
| Example 13 | acetylene | 0.69 | absent | 1081 | 2.58 |
| Example 14 | propane | 0.94 | absent | 1224 | 3.54 |

TABLE 2-continued

| No. | Carburizing gas | Surface carbon concentration (weight percent) | Presence or absence of carbide | Tooth base fatigue strength (GPa) | Tooth surface fatigue strength (GPa) |
|---|---|---|---|---|---|
| Example 15 | acetylene | 0.91 | absent | 1225 | 3.43 |
| Example 16 | acetylene | 1.45 | absent | 1541 | 5.30 |
| Example 17 | acetylene | 0.93 | absent | 1217 | 3.48 |
| Example 18 | acetylene | 1.41 | absent | 1551 | 5.11 |
| Example 19 | acetylene | 1.35 | absent | 1431 | 5.01 |
| Comparative Example 1 | acetylene | 0.67 | present | 872 | 2.19 |
| Comparative Example 2 | acetylene | 0.78 | present | 81 | 2.14 |
| Comparative Example 3 | acetylene | 0.72 | present | 848 | 2.18 |
| Comparative Example 4 | acetylene | 0.84 | present | 820 | 2.17 |
| Comparative Example 5 | acetylene | 0.83 | present | 868 | 2.04 |
| Comparative Example 6 | acetylene | 0.76 | present | 864 | 2.08 |

The mechanical part of the invention can be applied to a sun gear for use in planetary gear for automatic transmission. In this case, a gear part before carburizing treatment can be obtained by rolling a steel material having a predetermined component composition to form a bar steel; cutting the bar steel, followed by hot forging and subsequent normalizing treatment; subjecting it to a blank machining into an analogous shape of a part, followed by a machine work such as gear cutting.

Hot forging and normalizing treatment can be replaced by hot forging alone or annealing treatment and cold forging.

In the case that the mechanical part of the invention is applied to a sun gear for use in planetary gear for automatic transmission, hot forging and normalizing treatment may be omitted.

Furthermore, shaving on the tooth surface may be optionally carried out before carburizing treatment.

Furthermore, tooth surface may be optionally polished after high-frequency hardening.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2007-102249 filed on Apr. 9, 2007, the contents thereof being incorporated herein by reference.

What is claimed is:

1. A mechanical part, which is obtained by:
processing a steel into a shape of a part,
said steel having an alloy composition comprising, by weight percent,
C: 0.10 to 0.29%,
Si: 0.50 to 3.00%,
Mn: 0.30 to 3.00%,
P: 0.030% or less,
S: 0.030% or less,
Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

[Si %]+[Ni %]+[Cu %]−[Cr %]>0.50, wherein [Si %], [Ni %], [Cu %] and [Cr %] represent the concentration of Si, the concentration of Ni, the concentration of Cu and the concentration of Cr in the alloy composition, respectively;
subjecting the steel part to a carburizing treatment in a vacuum to provide a surface carbon concentration in the range of from 0.85 to 1.5 weight %, followed by gradually cooling the steel part, after the carburizing treatment is carried out, at a cooling rate of 1° C./sec or less; and
subsequently subjecting the steel part to a high-frequency hardening by heating and holding the steel part at a temperature in a range of 760 to 900° C., to thereby harden a surface of the steel part.

2. The mechanical part according to claim 1, wherein the alloy composition of the steel further comprises, by weight percent,
Mo: 2.00% or less.

3. The mechanical part according to claim 1, wherein the alloy composition of the steel further comprises, by weight percent,
at least one element selected from the group consisting of
Nb: 0.20% or less,
Ti: 0.20% or less, and
B: 0.01% or less.

4. The mechanical part according to claim 1, wherein the part is almost free from strain.

5. The mechanical part according to claim 4, which is a gear having a tooth base and teeth and wherein the tooth base fatigue strength (GPa) is from 1060 to 1551 and the tooth surface fatigue strength (GPa) is from 2.58 to 5.30.

6. The mechanical part according to claim 1, wherein the cooling rate continues until a temperature of 500° C. is reached.

7. The mechanical part according to claim 6, wherein the gradual cooling rate after the carburizing treatment is carried out at a cooling rate of 0.1° C./sec.

8. The mechanical part according to claim 1, wherein the carburization temperature is from 900 to 1050° C.

9. A mechanical part, which is obtained by:
processing a steel into a shape of a part,
said steel having an alloy composition comprising,
by weight percent, C: 0.10 to 0.29%,
Si: 0.50 to 3.00%,
Mn: 0.30 to 3.00%,
P: 0.030% or less,
S: 0.030% or less,
Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

$$[Si\%]+[Ni\%]+[Cu\%]-[Cr\%]>0.50,$$

wherein [Si %], [Ni %], [Cu %] and [Cr %] represent the concentration of Si, the concentration of Ni, the concentration of Cu and the concentration of Cr in the alloy composition, respectively;
subjecting the steel to a carburizing treatment in a vacuum, wherein the mechanical part has a surface carbon concentration in the range of 0.85 to 1.50 weight %;
gradually cooling the steel part after the carburizing treatment is carried out, at a cooling rate where martensitic transformation of the steel does not occur; and
subsequently subjecting the steel to a high-frequency hardening by heating and holding in a temperature in a range of 760 to 900° C. to thereby harden a surface of the steel.

10. The process according to claim 9, wherein the gradual cooling rate after the carburizing treatment is carried out, at a cooling rate of 0.1° C./sec.

11. The process according to claim 10, wherein the carburization temperature is from 900 to 1050° C.

12. A process for producing a mechanical part, which comprises:
processing a steel into a shape of a part,
said steel having an alloy composition comprising,
by weight percent,
C: 0.10 to 0.29%,
Si: 0.50 to 3.00%,
Mn: 0.30 to 3.00%,
P: 0.030% or less,
S: 0.030% or less,
Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

$$[Si\%]+[Ni\%]+[Cu\%]-[Cr\%]>0.50,$$

wherein [Si %], [Ni %], [Cu %] and [Cr %] represent the concentration of Si, the concentration of Ni, the concentration of Cu and the concentration of Cr in the alloy composition, respectively;
subjecting the steel part to a carburizing treatment in a vacuum to provide a surface carbon concentration in the range of from 0.85 to 1.5 weight %, followed by gradually cooling the steel part, after the carburizing treatment is carried out, at a cooling rate of 1° C./sec or less; and
subsequently subjecting the steel part to a high-frequency hardening by heating and holding the steel part at a temperature in a range of 760 to 900° C., to thereby harden a surface of the steel part.

13. The process for producing a mechanical part according to claim 12, wherein the alloy composition of the steel further comprises, by weight percent,
Mo: 2.00% or less.

14. The process for producing a mechanical part according to claim 12, wherein the alloy composition of the steel further comprises, by weight percent,
at least one element selected from the group consisting of
Nb: 0.20% or less,
Ti: 0.20% or less, and
B: 0.01% or less.

15. The process for producing a mechanical part according to claim 12, wherein after the gradual cooling, subjecting the part to high frequency hardening by heating within 10 seconds to a temperature in the range of 760 to 900° C., holding within 1 minute at a temperature in the range of 760 to 900° C. and then hardening under water cooling at a cooling rate 200 to 2,000° C. per second.

16. The process for producing a mechanical part according to claim 15, wherein the cooling rate continues until a temperature of 500° C. is reached.

17. The process according to claim 16, wherein the gradual cooling rate after the carburizing treatment is carried out at a cooling rate of 0.1° C./sec.

18. The process for producing a mechanical part according to claim 12, wherein the cooling rate continues until a temperature of 500° C. is reached.

19. The process according to claim 18, wherein the gradual cooling rate after the carburizing treatment is carried out at a cooling rate of 0.1° C./sec.

20. The process according to claim 12, wherein the carburization temperature is from 900 to 1050° C.

21. A process for producing a mechanical part, which comprises:
processing a steel into a shape of a part,
said steel having an alloy composition comprising,
by weight percent,
C: 0.10 to 0.29%,
Si: 0.50 to 3.00%,
Mn: 0.30 to 3.00%,
P: 0.030% or less,
S: 0.030% or less,
Cu: 0.01 to 1.00%,
Ni: 0.01 to 3.00%,
Cr: 0.20 to 1.00%,
Al: 0.20% or less,
N: 0.05% or less, and
the remainder of Fe and inevitable impurities, and
said alloy composition satisfying the following condition:

$$[Si\%]+[Ni\%]+[Cu\%]-[Cr\%]>0.50,$$

wherein [Si %], [Ni %], [Cu %] and [Cr %] represent the concentration of Si, the concentration of Ni, the concentration of Cu and the concentration of Cr in the alloy composition, respectively;
subjecting the steel to a carburizing treatment in a vacuum, wherein the mechanical part has a surface carbon concentration in the range of 0.85 to 1.50 weight %;
gradually cooling the steel part after the carburizing treatment is carried out, at a cooling rate where martensitic transformation of the steel does not occur; and
subsequently subjecting the steel to a high-frequency hardening by heating and holding in a temperature in a range of 760 to 900° C. to thereby harden a surface of the steel.

* * * * *